United States Patent
Gallagher et al.

(10) Patent No.: US 9,347,323 B2
(45) Date of Patent: May 24, 2016

(54) GAS TURBINE ENGINE AIRFOIL TOTAL CHORD RELATIVE TO SPAN

(71) Applicant: United Technologies Corporation, Hartford, CT (US)

(72) Inventors: Edward J. Gallagher, West Hartford, CT (US); Byron R. Monzon, Cromwell, CT (US); Ling Liu, Glastonbury, CT (US); Linda S. Li, Middlefield, CT (US); Darryl Whitlow, Middletown, CT (US); Barry M. Ford, Middletown, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 0 days.

(21) Appl. No.: 14/624,240

(22) Filed: Feb. 17, 2015

(65) Prior Publication Data

US 2015/0354362 A1  Dec. 10, 2015

Related U.S. Application Data

(60) Provisional application No. 61/941,810, filed on Feb. 19, 2014.

(51) Int. Cl.
*F01D 5/14* (2006.01)
*F02C 3/04* (2006.01)

(52) U.S. Cl.
CPC . *F01D 5/141* (2013.01); *F02C 3/04* (2013.01); *F05D 2220/36* (2013.01); *F05D 2250/71* (2013.01); *F05D 2250/713* (2013.01); *F05D 2250/75* (2013.01); *Y02T 50/672* (2013.01); *Y02T 50/673* (2013.01)

(58) Field of Classification Search
None
See application file for complete search history.

(56) References Cited

U.S. PATENT DOCUMENTS

| | | | |
|---|---|---|---|
| 2,934,259 A | 4/1960 | Hausmann |
| 3,287,906 A | 11/1966 | McCormick |
| 3,747,343 A | 7/1973 | Rosen |

(Continued)

FOREIGN PATENT DOCUMENTS

| | | |
|---|---|---|
| EP | 0801230 | 5/2009 |
| EP | 2226468 | 9/2010 |

(Continued)

OTHER PUBLICATIONS

Aerodynamic Design technique for Optimizing Fan Blade Spacing, Rogalsky et all., Proceedings of the 7th Annual Conference of the Computational Fluid Dynamics Society of Canada, 1999.

(Continued)

*Primary Examiner* — Dwayne J White
*Assistant Examiner* — Justin Seabe
(74) *Attorney, Agent, or Firm* — Carlson, Gaskey & Olds, P.C.

(57) ABSTRACT

An airfoil for a turbine engine includes pressure and suction sides that extend in a radial direction from a 0% span position at an inner flow path location to a 100% span position at an airfoil tip. The airfoil has a relationship between a total chord length and a span position and corresponds to a curve that has an increasing total chord length from the 0% span position to a first peak. The first peak occurs in the range of 45-65% span position, and the curve either remains generally constant or has a decreasing total chord length from the first peak to the 100% span position. The total chord length is at the 0% span position in the range of 8.2-10.5 inches (20.8-26.7 cm).

23 Claims, 6 Drawing Sheets

(56) References Cited

U.S. PATENT DOCUMENTS

| | | | |
|---|---|---|---|
| 4,012,172 | A | 3/1977 | Schwaar et al. |
| 4,431,376 | A | 2/1984 | Lubenstein et al. |
| 4,682,935 | A | 7/1987 | Martin |
| 4,826,400 | A | 5/1989 | Gregory |
| 4,900,230 | A | 2/1990 | Patel |
| 5,088,892 | A | 2/1992 | Weingold |
| 5,141,400 | A | 8/1992 | Murphy et al. |
| 5,167,489 | A | 12/1992 | Wadia et al. |
| 5,277,549 | A | 1/1994 | Chen et al. |
| 5,443,367 | A | 8/1995 | Samit et al. |
| 5,525,038 | A | 6/1996 | Sharma et al. |
| 5,624,234 | A | 4/1997 | Neely et al. |
| 5,642,985 | A | 7/1997 | Spear et al. |
| 5,725,354 | A | 3/1998 | Wadia et al. |
| 5,785,498 | A * | 7/1998 | Quinn ................. F01D 5/14 416/224 |
| 5,915,917 | A | 6/1999 | Eveker et al. |
| 6,059,532 | A | 5/2000 | Chen et al. |
| 6,079,948 | A | 6/2000 | Sasaki et al. |
| 6,299,412 | B1 | 10/2001 | Wood et al. |
| 6,312,219 | B1 | 11/2001 | Wood et al. |
| 6,328,533 | B1 | 12/2001 | Decker et al. |
| 6,331,100 | B1 | 12/2001 | Liu |
| 6,341,942 | B1 | 1/2002 | Chou et al. |
| 6,899,526 | B2 | 5/2005 | Doloresco et al. |
| 6,994,524 | B2 | 2/2006 | Owen et al. |
| 7,204,676 | B2 | 4/2007 | Dutton et al. |
| 7,374,403 | B2 | 5/2008 | Decker et al. |
| 7,396,205 | B2 | 7/2008 | Dube et al. |
| 7,476,086 | B2 | 1/2009 | Wadia et al. |
| 7,497,664 | B2 | 3/2009 | Walter et al. |
| 7,547,186 | B2 | 6/2009 | Schuster et al. |
| 7,785,075 | B2 | 8/2010 | Botrel et al. |
| 7,806,653 | B2 | 10/2010 | Burton et al. |
| 7,967,571 | B2 | 6/2011 | Wood et al. |
| 7,997,872 | B2 | 8/2011 | Wilson |
| 7,997,882 | B2 | 8/2011 | Shulver et al. |
| 8,087,885 | B2 | 1/2012 | Suciu |
| 8,147,207 | B2 | 4/2012 | Orosa et al. |
| 8,167,567 | B2 | 5/2012 | Kirchner et al. |
| 8,246,292 | B1 | 8/2012 | Morin et al. |
| RE43,710 | E | 10/2012 | Spear et al. |
| 8,393,870 | B2 | 3/2013 | Nash et al. |
| 8,464,426 | B2 | 6/2013 | Kirchner et al. |
| 2003/0086788 | A1 | 5/2003 | Chandraker |
| 2003/0163983 | A1 | 9/2003 | Seda et al. |
| 2004/0091353 | A1 | 5/2004 | Shahpar et al. |
| 2005/0031454 | A1 | 2/2005 | Doloresco et al. |
| 2005/0169761 | A1 | 8/2005 | Dube et al. |
| 2005/0254956 | A1 | 11/2005 | Dutton et al. |
| 2006/0210395 | A1 | 9/2006 | Schuster et al. |
| 2006/0228206 | A1 | 10/2006 | Decker et al. |
| 2007/0041841 | A1 | 2/2007 | Walter et al. |
| 2007/0160478 | A1 | 7/2007 | Jarrah et al. |
| 2007/0201983 | A1 | 8/2007 | Arinci et al. |
| 2007/0243068 | A1 | 10/2007 | Wadia et al. |
| 2008/0101959 | A1 | 5/2008 | McRae et al. |
| 2008/0107538 | A1 * | 5/2008 | Bois ................. F01D 5/141 416/223 A |
| 2008/0120839 | A1 | 5/2008 | Schilling |
| 2008/0148564 | A1 | 6/2008 | Burton et al. |
| 2008/0226454 | A1 | 9/2008 | Decker et al. |
| 2009/0226322 | A1 | 9/2009 | Clemen |
| 2009/0274554 | A1 | 11/2009 | Guemmer |
| 2009/0304518 | A1 | 12/2009 | Kodama et al. |
| 2009/0317227 | A1 | 12/2009 | Grover et al. |
| 2010/0054946 | A1 | 3/2010 | Orosa et al. |
| 2010/0554946 | | 3/2010 | Orosa et al. |
| 2010/0148396 | A1 | 6/2010 | Xie et al. |
| 2010/0232970 | A1 | 9/2010 | Murooka et al. |
| 2010/0254797 | A1 | 10/2010 | Grover et al. |
| 2010/0260609 | A1 | 10/2010 | Wood et al. |
| 2010/0331139 | A1 | 12/2010 | McCune |
| 2011/0081252 | A1 | 4/2011 | Li |
| 2011/0135482 | A1 | 6/2011 | Nash et al. |
| 2011/0150659 | A1 * | 6/2011 | Micheli ................. F04D 29/324 416/223 A |
| 2011/0206527 | A1 | 8/2011 | Harvey et al. |
| 2011/0225979 | A1 | 9/2011 | Hoeger et al. |
| 2011/0268578 | A1 | 11/2011 | Praisner et al. |
| 2011/0286850 | A1 | 11/2011 | Micheli et al. |
| 2012/0057982 | A1 | 3/2012 | O'Hearn et al. |
| 2012/0195767 | A1 | 8/2012 | Gervais et al. |
| 2012/0237344 | A1 | 9/2012 | Wood et al. |
| 2012/0243975 | A1 | 9/2012 | Breeze-Stringfellow et al. |
| 2012/0244005 | A1 | 9/2012 | Breeze-Stringfellow et al. |
| 2013/0008170 | A1 | 1/2013 | Gallagher et al. |
| 2013/0022473 | A1 | 1/2013 | Tran |
| 2013/0089415 | A1 | 4/2013 | Brown et al. |
| 2013/0149108 | A1 | 6/2013 | Webster |
| 2013/0164488 | A1 | 6/2013 | Wood et al. |
| 2013/0189117 | A1 | 7/2013 | Baltas et al. |
| 2013/0202403 | A1 | 8/2013 | Morin et al. |
| 2013/0219922 | A1 | 8/2013 | Gilson et al. |
| 2013/0224040 | A1 | 8/2013 | Straccia |
| 2013/0266451 | A1 | 10/2013 | Pesteil et al. |
| 2013/0340406 | A1 | 12/2013 | Gallagher et al. |
| 2014/0030060 | A1 | 1/2014 | Magowan |
| 2014/0248155 | A1 | 9/2014 | Merville et al. |

FOREIGN PATENT DOCUMENTS

| | | |
|---|---|---|
| EP | 2535527 | 12/2012 |
| EP | 2543818 | 1/2013 |
| GB | 1516041 | 6/1978 |
| GB | 2041090 | 9/1980 |
| WO | 2007038674 | 4/2007 |

OTHER PUBLICATIONS

Turbine Design and Application. vol. 2. NASA, 1973.

Analytical Parametric Investigation of Low Pressure Ration Fan, NASA, 1973 Metzger et al.

Oyama et al., Multiobjective Optimization of a Multi-Stage Compressor Using Evolutionary Algorithm, NASA, 2002, AIAA 2002-3535 pp. 1-11.

The International Search Report and Written Opinion for PCT Application No. PCT/US2015/016187, mailed May 20, 2015.

The International Search Report and Written Opinion for PCT Application No. PCT/US2015/016011, mailed May 21, 2015.

The International Search Report and Written Opinion for PCT Application No. PCT/US2015/016078, mailed May 29, 2015.

The International Search Report and Written Opinion for PCT Application No. PCT/US2015/016154, mailed May 22, 2015.

The International Search Report and Written Opinion for PCT Application No. PCT/US2015/016086, mailed May 26, 2015.

The International Search Report and Written Opinion for PCT Application No. PCT/US2015/016554, mailed May 26, 2015.

The International Search Report and Written Opinion for PCT Application No. PCT/US2015/015554, mailed May 21, 2015.

The International Search Report and Written Opinion for PCT Application No. PCT/US2014/052325, mailed May 29, 2015.

The International Search Report and Written Opinion for PCT Application No. PCT/US2015/016378, mailed May 29, 2015.

The International Search Report and Written Opinion for PCT Application No. PCT/US2014/052293, mailed May 29, 2015.

The International Search Report and Written Opinion for PCT Application No. PCT/US2014/052516, mailed Jun. 10, 2015.

Smith, L.,Yeh,H.,(1963).Sweep and Dihedral Effects in Axial-Flow Turbomachinery;Journal of Basic Engineering; Sep. 1963.pp. 401-416.

Engine Specifications. Engine Alliance GP7200—The Engine for the A380. Retrieved Feb. 19, 2015 from http://www.enginealliance.com/engine_specifications.html.

The International Search Report and Written Opinion for PCT Application No. PCT/US2015/016083, mailed Jul. 21, 2015.

International Search Report and Written Opinion for PCT Application No. PCT/US2015/016018, mailed Nov. 24, 2015.

International Search Report and Written Opinion for PCT Application No. PCT/US2015016091, mailed Nov. 24, 2015.

(56) References Cited

OTHER PUBLICATIONS

International Search Report and Written Opinion for PCT Application No. PCT/US2015/016032, mailed Nov. 24, 2015.
International Search Report and Written Opinion for PCT Application No. PCT/US2015/016135, mailed Nov. 24, 2015.
International Search Report and Written Opinion for PCT Application No. PCT/US2015/016584, mailed Nov. 24, 2015.
International Search Report and Written Opinion for PCT Application no. PCT/US2015/015561, mailed Nov. 24, 2015.
International Search Report and Written Opinion for PCT Application No. PCT/US2015/015575, mailed Nov. 24, 2015.
International Search Report and Written Opinion for PCT Application No. PCT/US2015/015579, mailed Nov. 24, 2015.
International Search Report and Written Opinion for PCT Application No. PCT/US2015/015586, mailed Nov. 24, 2015.
Conference on Engineering and Physics: Synergy for Success 2006. Journal of Physics: Conference Series vol. 105. London, UK. Oct. 5, 2006.
Kurzke, J. (2009). Fundamental differences between conventional and geared turbofans. Proceedings of ASME Turbo Expo: Power for Land, Sea, and Air. 2009, Orlando, Florida.
Agarwal, B.D and Broutman, L.J. (1990). Analysis and performance of fiber composites, 2nd Edition. John Wiley & Sons, Inc. New York: New York.
Brines, G.L (1990). The turbofan of tomorrow. Mechanical Engineering: The Journal of the American Society of Mechanical Engineers, 108(8), 65-67.
Faghri, A. (1995). Heat pipe and science technology. Washington, D.C.: Taylor & Francis.
Hess, C. (1998). Pratt & Whitney develops geared turbofan. Flug Revue 43(7). Oct. 1998.
Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modem Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report. NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston, L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc.
Ratna, D. (2009). Handbook of thermoset resins. Shawbury, UK: iSmithers.
Wendus, B.E., Stark, D.F., Holler, R.P., and Funkhouser, M.E. (2003). Follow-on technology requirement study for advanced subsonic transport. NASA/CR-2003-212467.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF502: plugging the turbofan gap. Flight International, pp. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010.

\* cited by examiner

GAS TURBINE ENGINE AIRFOIL TOTAL CHORD RELATIVE TO SPAN

CROSS-REFERENCE TO RELATED APPLICATIONS

This application claims priority to U.S. Provisional Application No. 61/941,810, which was filed on Feb. 19, 2014 and is incorporated herein by reference.

BACKGROUND

This disclosure relates generally to an airfoil for gas turbine engines, and more particularly to a fan or compressor blade and the relationship between the blade's total chord relative to span.

A turbine engine such as a gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The propulsive efficiency of a gas turbine engine depends on many different factors, such as the design of the engine and the resulting performance debits on the fan that propels the engine. As an example, the fan may rotate at a high rate of speed such that air passes over the fan airfoils at transonic or supersonic speeds. The fast-moving air creates flow discontinuities or shocks that result in irreversible propulsive losses. Additionally, physical interaction between the fan and the air causes downstream turbulence and further losses. Although some basic principles behind such losses are understood, identifying and changing appropriate design factors to reduce such losses for a given engine architecture has proven to be a complex and elusive task.

SUMMARY

In one exemplary embodiment, an airfoil for a turbine engine includes pressure and suction sides that extend in a radial direction from a 0% span position at an inner flow path location to a 100% span position at an airfoil tip. The airfoil has a relationship between a total chord length and a span position and corresponds to a curve that has an increasing total chord length from the 0% span position to a first peak. The first peak occurs in the range of 45-65% span position, and the curve either remains generally constant or has a decreasing total chord length from the first peak to the 100% span position. The total chord length is at the 0% span position in the range of 8.2-10.5 inches (20.8-26.7 cm).

In a further embodiment of the above, the curve is at least a third order polynomial with a generally S-shaped curve that has an initial positive slope.

In a further embodiment of any of the above, the total chord length includes a maximum differential between the maximum and minimum chord lengths along the entire span in the range of 3.0-4.0 inches (7.6-10.2 cm).

In a further embodiment of any of the above, the peak is provided by a critical point in a range of 60-70% span position.

In a further embodiment of any of the above, a negative slope extends from the critical point to a second critical point in a range of 80-90% span position.

In a further embodiment of any of the above, the second critical point has an $L/R_d$ ratio in the range of 0.32 to 0.35.

In a further embodiment of any of the above, a positive slope extends from the second critical point to the 100% span position. The total chord length is at the 100% span position less than the total chord length at the peak.

In a further embodiment of any of the above, the peak is provided by a critical point in a range of 50-60% span position.

In a further embodiment of any of the above, a slope from the critical point to an inflection point is substantially zero. The inflection point is in a range of 70-80% span position.

In a further embodiment of any of the above, a positive slope extends from the inflection point to the 100% span position.

In a further embodiment of any of the above, the 100% span position has an $L/R_d$ ratio in the range of 0.38 to 0.42.

In a further embodiment of any of the above, the positive slope extends from the inflection point to the 100% span position is generally constant.

In a further embodiment of any of the above, the peak is provided by a critical point in a range of 40-50% span position.

In a further embodiment of any of the above, a negative slope extends from the critical point to the 100% span position.

In a further embodiment of any of the above, the negative slope is generally constant from about a 55% span position to the 100% span position.

In a further embodiment of any of the above, the critical point has an $L/R_d$ ratio in the range of 0.39 to 0.43.

In a further embodiment of any of the above, the airfoil is a fan blade for a gas turbine engine.

In another exemplary embodiment, a gas turbine engine includes a combustor section that is arranged between a compressor section and a turbine section, a fan section having an array of twenty-six or fewer fan blades and has a low fan pressure ratio of less than 1.55 and a geared architecture coupling the fan section to the turbine section or compressor section. The fan blades include an airfoil that has pressure and suction sides. The airfoil extends in a radial direction from a 0% span position at an inner flow path location to a 100% span position at an airfoil tip. The airfoil has a relationship between a total chord length and a span position and corresponds to a curve that has an increasing total chord length from the 0% span position to a first peak. The first peak occurs in the range of 45-65% span position, and the curve either remains generally constant or has a decreasing total chord length from the first peak to the 100% span position. The total chord length is at the 0% span position in the range of 8.2-10.5 inches (20.8-26.7 cm).

In another exemplary embodiment, a gas turbine engine includes a combustor section that is arranged between a compressor section and a turbine section, a fan section has a low fan pressure ratio of less than 1.55. The fan blades include an airfoil that has pressure and suction sides. The airfoil extends in a radial direction from a 0% span position at an inner flow path location to a 100% span position at an airfoil tip. The airfoil has a relationship between a total chord length and a span position and corresponds to a curve that has an increasing total chord length from the 0% span position to a first peak. The first peak occurs in the range of 45-65% span position, and the curve either remains generally constant or has a decreasing total chord length from the first peak to the 100% span position. The total chord length is at the 0% span position in the range of 8.2-10.5 inches (20.8-26.7 cm).

In a further embodiment of any of the above, the low fan pressure ratio is less than about 1.52.

In a further embodiment of any of the above, the low fan pressure ratio is less than about 1.50.

In a further embodiment of any of the above, the low fan pressure ratio is less than about 1.48.

In a further embodiment of any of the above, the low fan pressure ratio is less than about 1.46.

In a further embodiment of any of the above, the low fan pressure ratio is less than about 1.44.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
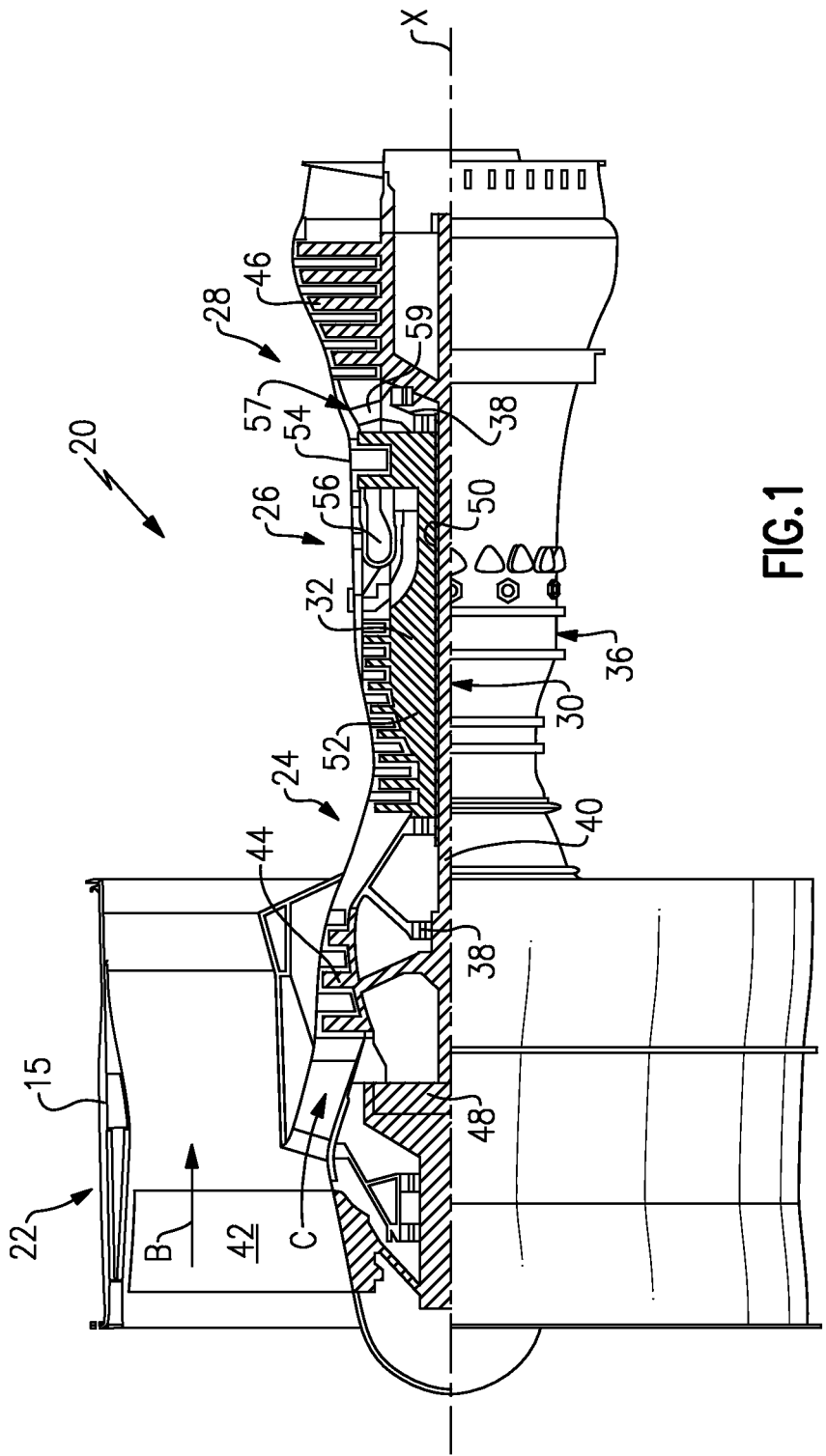
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. That is, the disclosed airfoils may be used for engine configurations such as, for example, direct fan drives, or two- or three-spool engines with a speed change mechanism coupling the fan with a compressor or a turbine sections.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.55. In another non-limiting embodiment the low fan pressure ratio is less than about 1.52. In another non-limiting embodiment the low fan pressure ratio is less than about 1.50. In another non-limiting embodiment the low fan pressure ratio is less than about 1.48. In another non-limiting embodiment the low fan pressure ratio is less than about 1.46. In another non-limiting embodiment the low fan pressure ratio is less than about 1.44. In another non-limiting embodiment the low fan pressure ratio is from 1.1 to 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second. The "low corrected fan tip speed" as disclosed herein according to another non-limiting embodiment is less than about 1200 ft/second.

Figure 2A:
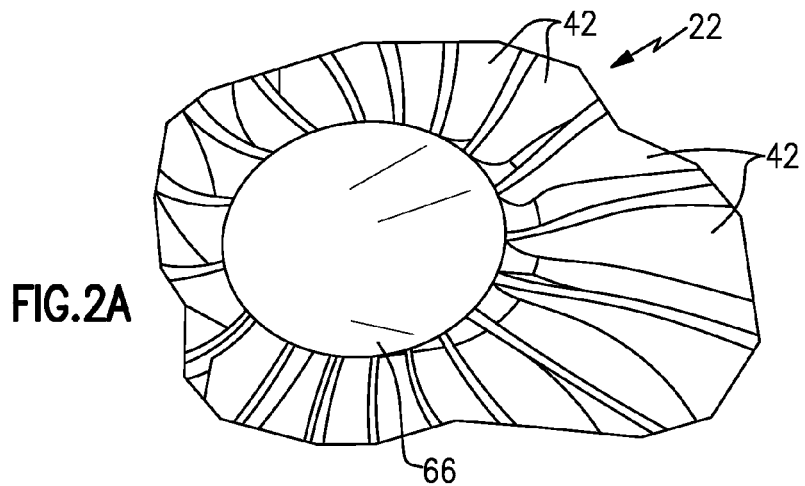
FIG. 2A is a perspective view of a portion of a fan section.
Figure 2B:
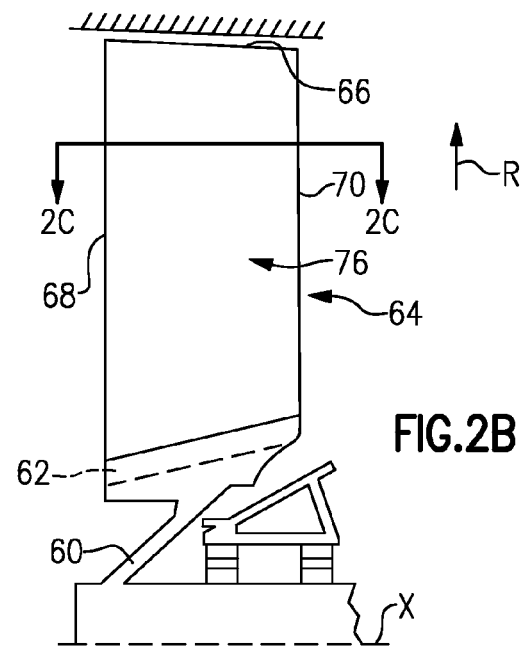
FIG. 2B is a schematic cross-sectional view of the fan section.
Figure 2C:
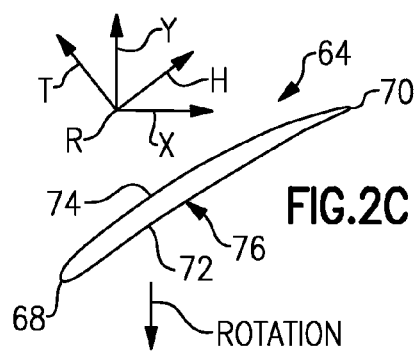
FIG. 2C is a cross-sectional view a fan blade taken along line 2C-2C in FIG. 2B.

Referring to FIG. 2A-2C, the fan blade 42 is supported by a fan hub 60 that is rotatable about the axis X. Each fan blade 42 includes an airfoil 64 extending in a radial span direction R from a root 62 to a tip 66. A 0% span position corresponds to a section of the airfoil 64 at the inner flow path (e.g., a platform), and a 100% span position corresponds to a section of the airfoil 64 at the tip 66.

The root 62 is received in a correspondingly shaped slot in the fan hub 60. The airfoil 64 extends radially outward of the platform, which provides the inner flow path. The platform may be integral with the fan blade or separately secured to the fan hub, for example. A spinner 66 is supported relative to the fan hub 60 to provide an aerodynamic inner flow path into the fan section 22.

The airfoil 64 has an exterior surface 76 providing a contour that extends from a leading edge 68 aftward in a chordwise direction H to a trailing edge 70, as shown in FIG. 2C. Pressure and suction sides 72, 74 join one another at the leading and trailing edges 68, 70 and are spaced apart from one another in an airfoil thickness direction T. An array of the fan blades 42 are positioned about the axis X in a circumferential or tangential direction Y. Any suitable number of fan blades may be used in a given application.

The exterior surface 76 of the airfoil 64 generates lift based upon its geometry and directs flow along the core flow path C. The fan blade 42 may be constructed from a composite material, or an aluminum alloy or titanium alloy, or a combination of one or more of these. Abrasion-resistant coatings or other protective coatings may be applied to the fan blade 42.

Figure 3A:
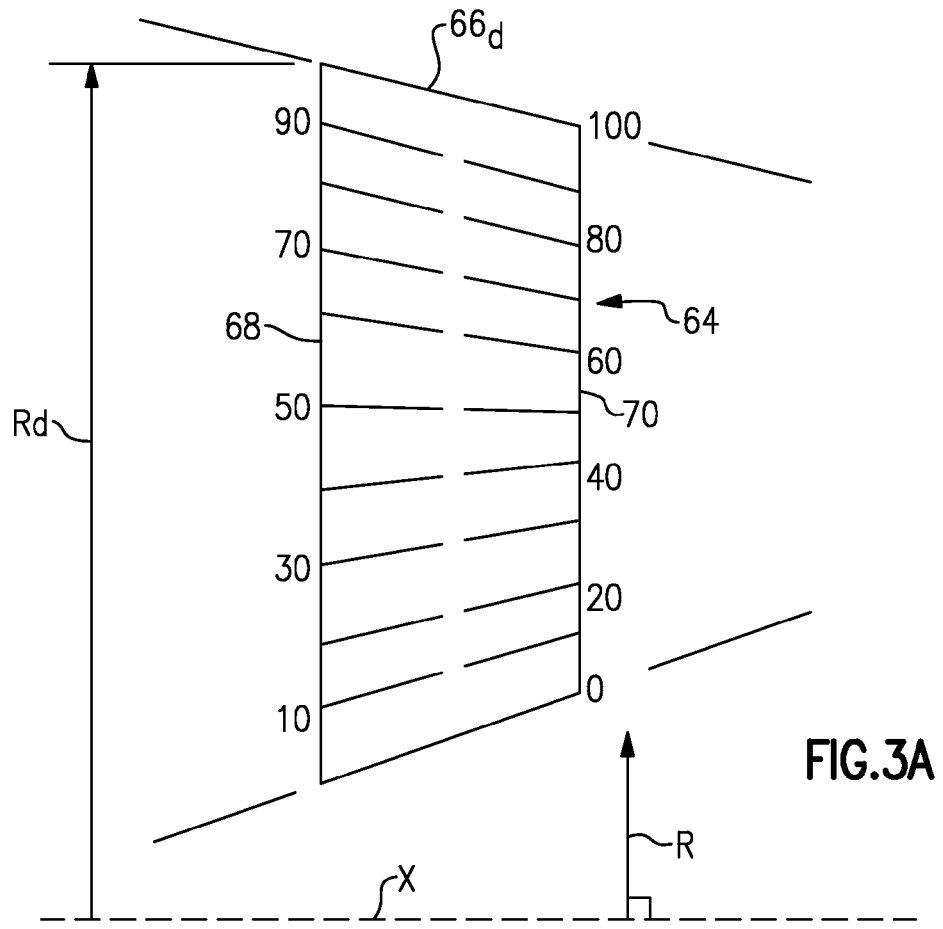
FIG. 3A is a schematic view of fan blade span positions.

One characteristic of fan blade performance relates to the fan blade's total chord relative to a particular span position (R direction). Referring to FIG. 3A, span positions a schematically illustrated from 0% to 100% in 10% increments. Each section at a given span position is provided by a conical cut that corresponds to the shape of the core flow path, as shown by the large dashed lines. In the case of a fan blade with an integral platform, the 0% span position corresponds to the radially innermost location where the airfoil meets the fillet joining the airfoil to the platform. In the case of a fan blade without an integral platform, the 0% span position corresponds to the radially innermost location where the discrete platform meets the exterior surface of the airfoil. In addition to varying with span, total chord varies between a hot, running condition and a cold, static ("on the bench") condition.

Figure 3B:
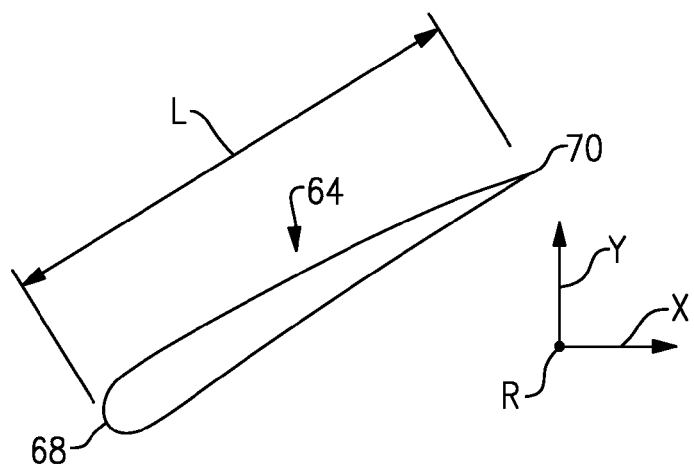
FIG. 3B is a schematic view of a cross-section of a fan blade section at a particular span position and its chord length.

The total chord corresponds to a chord length L extending from the leading edge 68 to the trailing edge 70 at a given span position, as shown in FIG. 3B. The chord length L changes along the span of the airfoil 64 to achieve a desired aerodynamic performance for the fan blade. The total chord may also be expressed as a ratio to the span distance $R_d$, where $R_d$ is the radial distance from hub's rotational axis X to the tip of the leading edge 68 and where the ratio is $L/R_d$. $R_d$ as disclosed herein according to one non-limiting embodiment is about 35-37 inches (0.89-0.94 meters). In another non-limiting embodiment $R_d$ is about 27-29 inches (0.69-0.74 meters). In another non-limiting embodiment $R_d$ is about 39-41 inches (0.99-1.04 meters). One example prior art airfoil has an $R_d$ of about 57-59 inches (1.45-1.50 meters).

In one example prior art airfoil, a peak between positive and negative slopes is provided in a range of 50% span to 55% span at which point the curve includes an $L/R_d$ ratio of 0.35-0.36. The total chord L at 0% span is around 14 inches (35-36 cm).

Figure 4A:
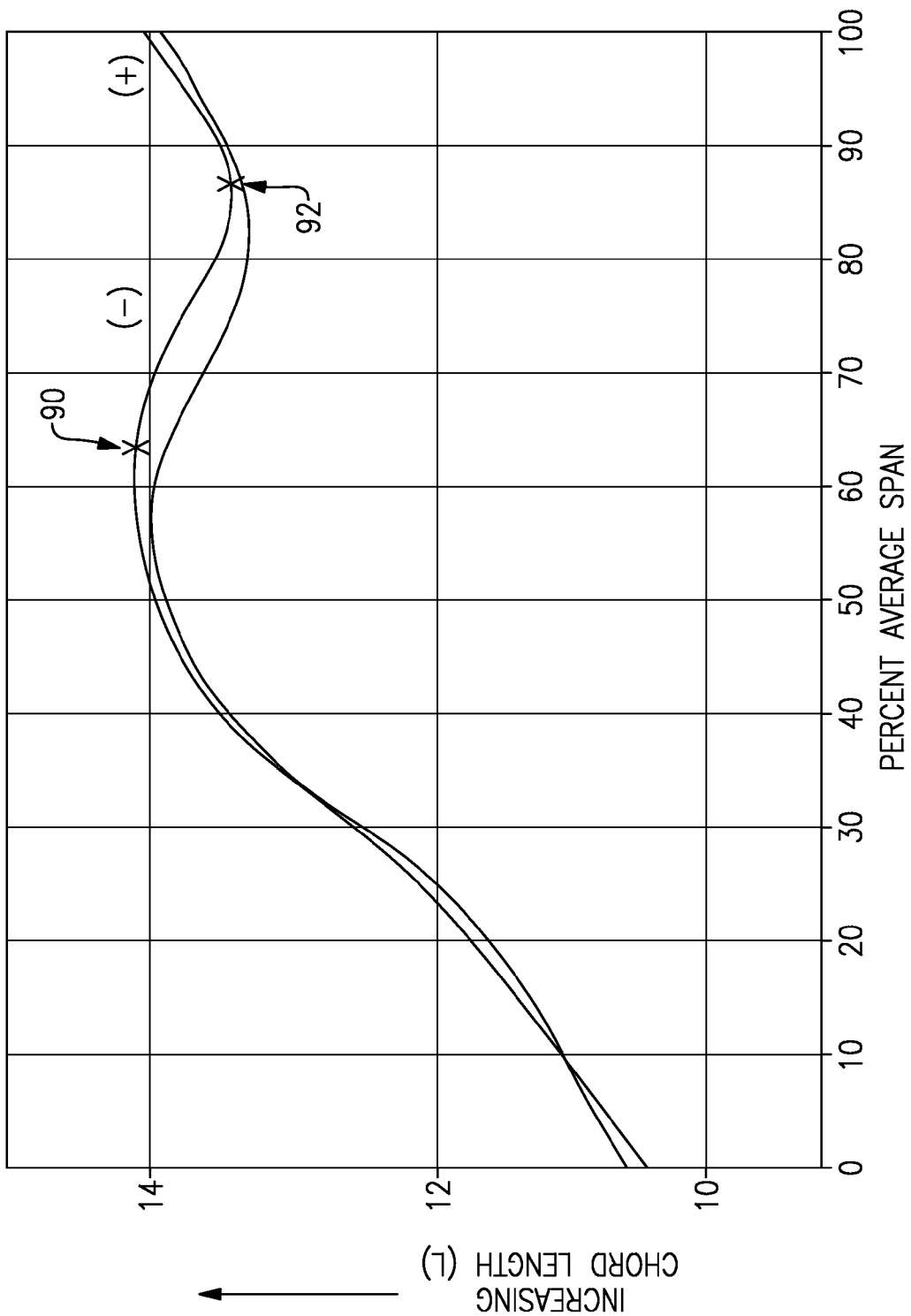
FIG. 4A illustrates a relationship between total chord and span position for a set of first example airfoils.
Figure 4B:
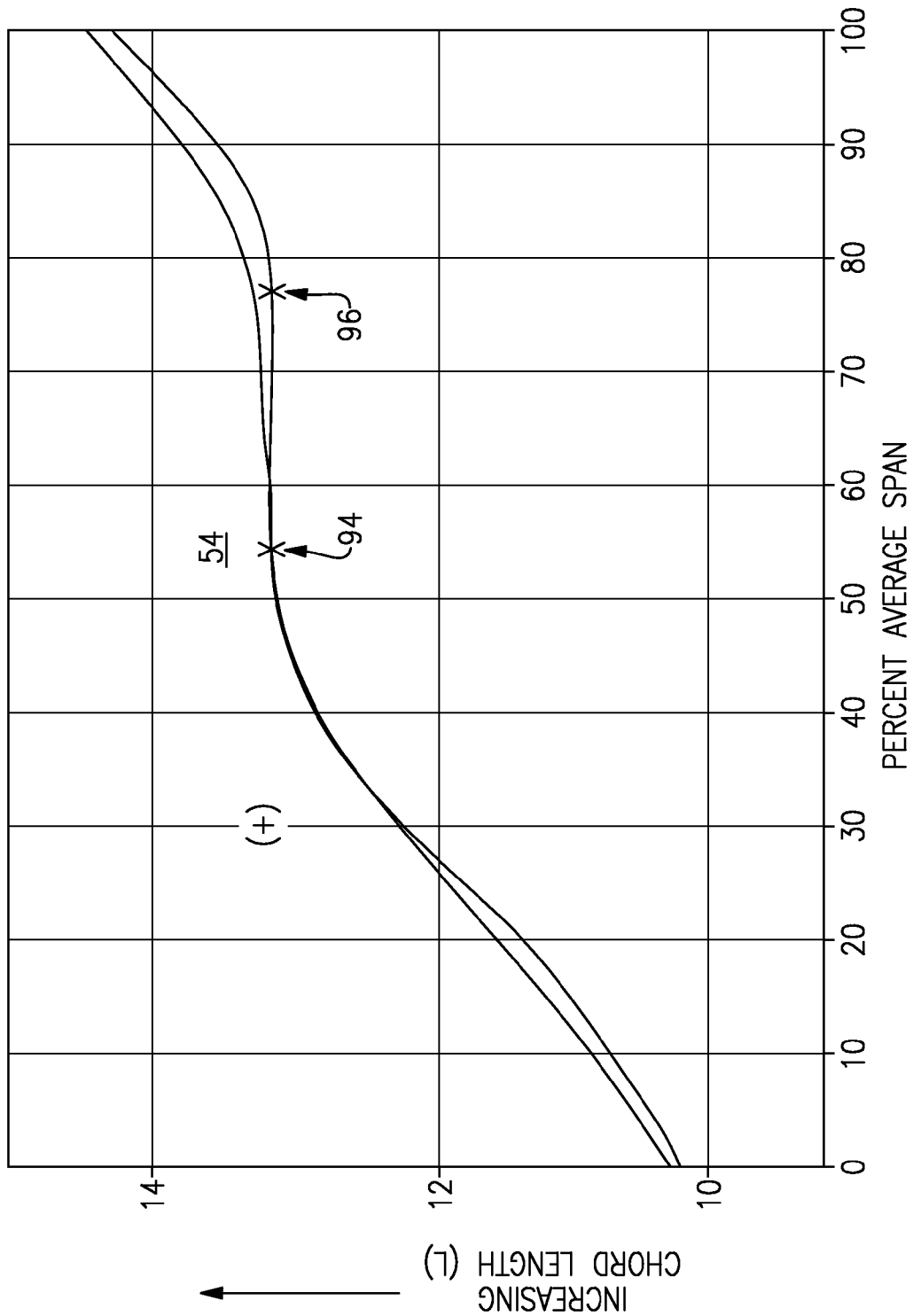
FIG. 4B illustrates a relationship between total chord and span position for a set of second example airfoils.
Figure 4C:
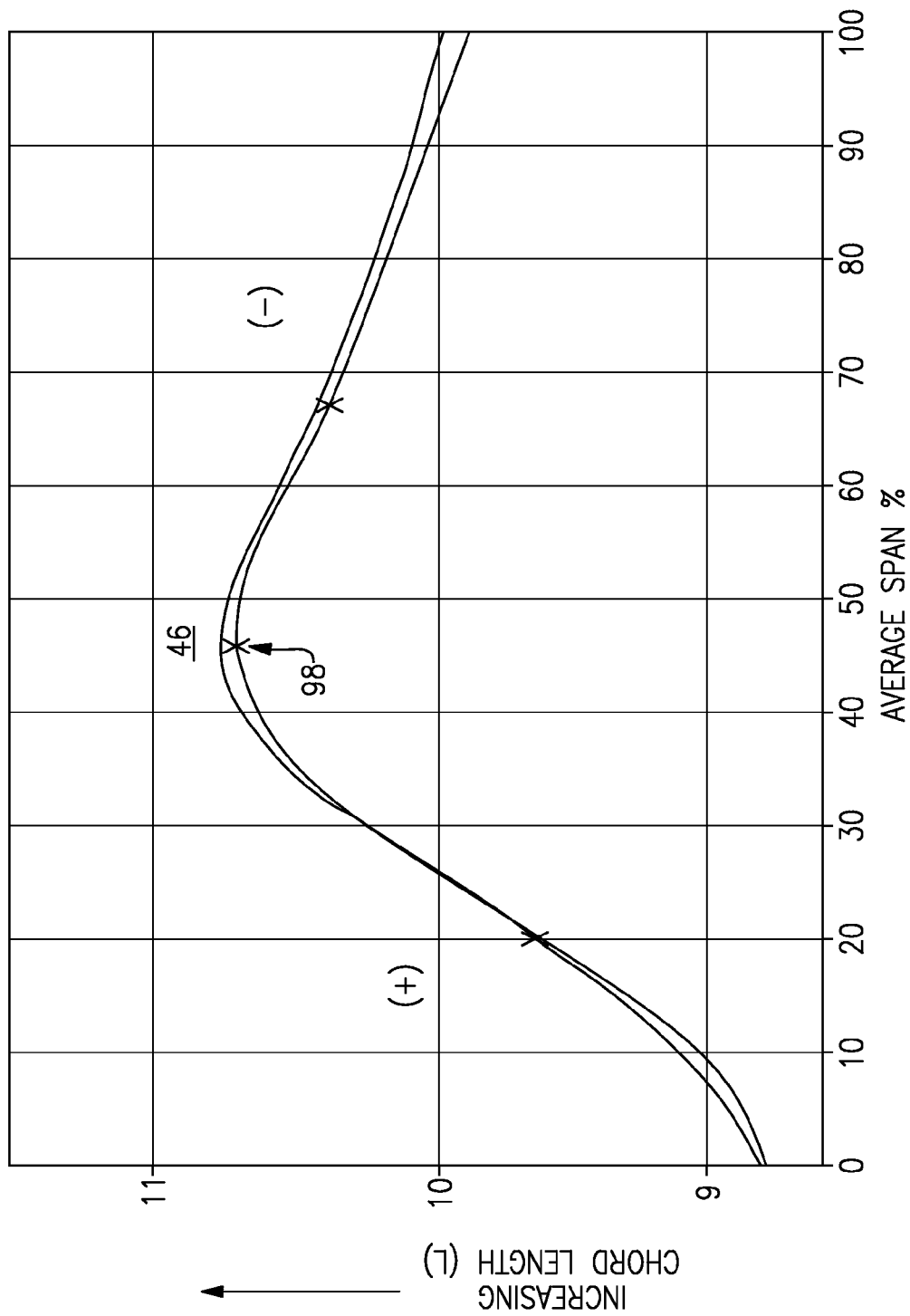
FIG. 4C illustrates a relationship between total chord and span position for a set of third example airfoils.

Example relationships between the total chord length L and the span position (PERCENT AVERAGE SPAN), which is the average of the radial position at the leading and trailing edges 68, 70, are shown in FIGS. 4A-4C for several example fan blades, each represented by a curve. Only one curve in each graph is discussed for simplicity. Each relationship starts with a total chord length at the 0% span position in the range of 8.2-10.5 inches (20.8-26.7 cm). The fan blades include a maximum differential between the maximum and minimum chord lengths along the entire span in the range of 3.0-4.0 inches (7.6-10.2 cm). The curves have an increasing total chord length (positive slope from the 0% span position to a first peak. The first peak occurs in the range of 45-65% span position, after which the curve either remains generally constant (no slope/no change in total chord length) or has a decreasing total chord length (negative slope). The example curves are at least a third order polynomial with a generally S-shaped curve having an initial positive slope. Some notable points are indicated by an "x" on the curve.

Referring to FIG. 4A, the peak is provided by a critical point in a range of 60-70% span position. The critical point has an $L/R_d$ ratio in the range of 0.34 to 0.37. A negative slope extends from the critical point to a second critical point in a range of 80-90% span position. The second critical point has an $L/R_d$ ratio in the range of 0.32 to 0.35. A positive slope extends from the second critical point to the 100% span position, and the total chord length at the 100% span position less than the total chord length at the peak.

Referring to FIG. 4B, the peak is provided by a critical point in a range of 50-60% span position. A slope from the critical point to an inflection point is substantially zero. The inflection point in a range of 70-80% span position. A positive slope extends from the inflection point to the 100% span position. The 100% span position has an $L/R_d$ ratio in the range of 0.38 to 0.42. The positive slope extending from the inflection point to the 100% span position is generally constant.

Referring to FIG. 4C, the peak is provided by a critical point in a range of 40-50% span position. A negative slope extends from the critical point to the 100% span position. The negative slope is generally constant from about a 55% span position to the 100% span position. The critical point has an $L/R_d$ ratio in the range of 0.39 to 0.43.

The total chord in a hot, running condition along the span of the airfoils 64 relate to the contour of the airfoil and provide necessary fan operation in cruise at the lower, preferential speeds enabled by the geared architecture 48 in order to enhance aerodynamic functionality and thermal efficiency. As used herein, the hot, running condition is the condition during cruise of the gas turbine engine 20. For example, the total chord in the hot, running condition can be determined in a known manner using numerical analysis, such as finite element analysis.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for a turbine engine comprising:
pressure and suction sides extending in a radial direction from a 0% span position at an inner flow path location to a 100% span position at an airfoil tip, wherein the airfoil has a relationship between a total chord length and a span position corresponding to a curve having an increasing total chord length from the 0% span position to a first peak, the first peak occurs in the range of 45-65% span position, the curve either remains constant or has a decreasing total chord length from the first peak toward the 100% span position, wherein the total chord length at the 0% span position in the range of 8.2-10.5 inches (20.8-26.7 cm), wherein the total chord length includes a maximum differential between the maximum and minimum chord lengths along the entire span in the range of 3.0-4.0 inches (7.6-10.2 cm).

2. The airfoil according to claim 1, wherein the curve is at least a third order polynomial having an initial positive slope.

3. The airfoil according to claim 1, wherein the peak is provided by a first critical point in a range of 60-65% span position.

4. The airfoil according to claim 3, wherein a negative slope extends from the critical point to a second critical point in a range of 80-90% span position.

5. The airfoil according to claim 4, wherein the second critical point has an $L/R_d$ ratio in the range of 0.32 to 0.35.

6. The airfoil according to claim 4, wherein a positive slope extends from the second critical point to the 100% span position, the total chord length at the 100% span position less than the total chord length at the peak.

7. The airfoil according to claim 1, wherein the peak is provided by a critical point in a range of 50-60% span position.

8. The airfoil according to claim 7, wherein a slope from the critical point to an inflection point is substantially zero, the inflection point in a range of 70-80% span position.

9. The airfoil according to claim 8, wherein a positive slope extends from the inflection point to the 100% span position.

10. The airfoil according to claim 9, wherein the 100% span position has an $L/R_d$ ratio in the range of 0.38 to 0.42.

11. The airfoil according to claim 9, wherein the positive slope extending from the inflection point to the 100% span position is constant.

12. The airfoil according to claim 1, wherein the peak is provided by a critical point in a range of 40-50% span position.

13. The airfoil according to claim 12, wherein a negative slope extends from the critical point to the 100% span position.

14. The airfoil according to claim 13, wherein the negative slope is constant from about a 55% span position to the 100% span position.

15. The airfoil according to claim 12, wherein the critical point has an $L/R_d$ ratio in the range of 0.39 to 0.43.

16. The airfoil according to claim 1, wherein the airfoil is a fan blade for a gas turbine engine.

17. A gas turbine engine comprising:
a combustor section arranged between a compressor section and a turbine section;
a fan section having an array of twenty-six or fewer fan blades, wherein the fan section has a low fan pressure ratio of less than 1.55;
a geared architecture coupling the fan section to the turbine section or compressor section; and
wherein the fan blades include an airfoil having pressure and suction sides, the airfoil extends in a radial direction from a 0% span position at an inner flow path location to a 100% span position at an airfoil tip, wherein the airfoil has a relationship between a total chord length and a span position corresponding to a curve having an increasing total chord length from the 0% span position to a first peak, the first peak occurs in the range of 45-65% span position the curve either remains constant or has a decreasing total chord length from the first peak toward the 100% span position, wherein the total chord length at the 0% span position in the range of 8.2-10.5 inches (20.8-26.7 cm), wherein the total chord length includes a maximum differential between the maximum and minimum chord lengths along the entire span in the range of 3.0-4.0 inches (7.6-10.2 cm).

18. A gas turbine engine comprising:
a combustor section arranged between a compressor section and a turbine section;
a fan section has alow fan pressure ratio of less than 1.55; and
wherein the fan blades include an airfoil having pressure and suction sides, the airfoil extends in a radial direction from a 0% span position at an inner flow path location to a 100% span position at an airfoil tip, wherein the airfoil has a relationship between a total chord length and a span position corresponding to a curve having an increasing total chord length from the 0% span position to a first peak, the first peak occurs in the range of 45-65% span position the curve either remains constant or has a decreasing total chord length from the first peak toward the 100% span position, wherein the total chord length at the 0% span position in the range of 8.2-10.5 inches (20.8-26.7 cm), wherein the total chord length includes a maximum differential between the maximum and minimum chord lengths along the entire span in the range of 3.0-4.0 inches (7.6-10.2 cm).

19. The gas turbine engine according to claim 18, wherein the low fan pressure ratio is less than 1.52.

20. The gas turbine engine according to claim 19, wherein the low fan pressure ratio is less than 1.50.

21. The gas turbine engine according to claim 20, wherein the low fan pressure ratio is less than 1.48.

22. The gas turbine engine according to claim 21, wherein the low fan pressure ratio is less than 1.46.

23. The gas turbine engine according to claim 22, wherein the low fan pressure ratio is less than 1.44.

* * * * *